(12) United States Patent
Bugbee et al.

(10) Patent No.: US 11,431,764 B2
(45) Date of Patent: Aug. 30, 2022

(54) COMBINABLE CONFERENCE ROOMS

(71) Applicant: Charter Communications Operating, LLC, St. Louis, MO (US)

(72) Inventors: Richard Bugbee, Charlotte, NC (US); Christopher T. Jones, Kannapolis, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 48 days.

(21) Appl. No.: 16/817,752

(22) Filed: Mar. 13, 2020

(65) Prior Publication Data
US 2021/0289007 A1  Sep. 16, 2021

(51) Int. Cl.
| H04M 3/00 | (2006.01) |
| H04M 5/00 | (2006.01) |
| H04L 12/66 | (2006.01) |
| H04L 65/1069 | (2022.01) |
| H04L 65/1046 | (2022.01) |

(52) U.S. Cl.
CPC ...... H04L 65/1069 (2013.01); H04L 65/1046 (2013.01)

(58) Field of Classification Search
CPC .... G06F 3/04842; G06F 3/005; G06F 3/0482; G06F 13/102; G06F 3/1423; G06F 3/1454; G06F 3/165; G06F 3/16; G06F 3/147; G06F 3/04817; G06F 3/0488; H04N 7/15; H04N 7/147; H04N 13/279; H04M 3/567; H04M 7/0027; H04M 1/72454; H04M 1/72448; H04M 1/72469; H04M 2250/62; H04M 3/56; H04M 2201/42; H04M 3/564; H04R 2420/07; H04R 3/005; H04R 3/12; H04R 1/406; H04R 2227/003; H04R 2227/009; H04R 2420/01; H04R 27/00
USPC ........ 348/7.083, 14.08, 7.084, 204; 709/219, 709/231, 203, 208; 715/753; 725/78
See application file for complete search history.

(56) References Cited

U.S. PATENT DOCUMENTS

| 2003/0103075 A1* | 6/2003 | Rosselot | ................ H04N 7/147 715/717 |
| 2005/0024484 A1* | 2/2005 | Leonard | ................ H04N 7/142 348/14.01 |

(Continued)

*Primary Examiner* — Kharye Pope
(74) *Attorney, Agent, or Firm* — Young Basile Hanlon & MacFarlane, P.C.

(57) ABSTRACT

Methods and systems for combinable conference rooms. The method including establishing a baseline audio and video (AV) signal flow for combinable rooms in a baseline state, generating a baseline macroinstruction for the baseline state, establishing non-baseline AV signal flows for one or more non-baseline states, where each non-baseline AV signal flow turns off certain paths in the baseline AV signal flow to establish AV signal flow isolation between certain of the combinable conference rooms, generating a non-baseline macroinstruction for each of the one or more non-baseline states, providing an interface for selecting the baseline and each non-baseline macroinstruction, where the baseline and each non-baseline macroinstructions are generated for operation with an AV controller and the interface which collectively control AV signal flow of the combinable conference rooms, and configuring the combinable conference rooms based on selection, via the interface, of one of the baseline or the non-baseline macroinstructions.

20 Claims, 8 Drawing Sheets

(56) References Cited

U.S. PATENT DOCUMENTS

| | | | | |
|---|---|---|---|---|
| 2007/0030984 A1* | 2/2007 | Gotfried | ............... | H04N 7/147 |
| | | | | 381/122 |
| 2008/0184115 A1* | 7/2008 | Back | .................. | G06F 3/04842 |
| | | | | 715/702 |
| 2009/0315975 A1* | 12/2009 | Wiener | .................. | H04N 7/152 |
| | | | | 348/14.09 |
| 2010/0318917 A1* | 12/2010 | Holladay | ............ | H04L 41/0893 |
| | | | | 715/735 |
| 2015/0326824 A1* | 11/2015 | Midtskogen Berger | ..................... | |
| | | | | H04L 65/1069 |
| | | | | 348/14.09 |
| 2016/0191575 A1* | 6/2016 | Jain | ...................... | H04L 65/403 |
| | | | | 370/261 |
| 2016/0320760 A1* | 11/2016 | Brun | ................... | G05B 19/042 |
| 2017/0147018 A1* | 5/2017 | Meruva | ................. | G06F 13/364 |
| 2017/0331904 A1* | 11/2017 | Padhye | ................. | H04L 67/148 |
| 2019/0018381 A1* | 1/2019 | Grodum | ............... | G05B 19/042 |
| 2019/0304408 A1* | 10/2019 | Seethaler | ............. | G06K 9/6202 |
| 2020/0341625 A1* | 10/2020 | Roedel | .................... | H04N 7/15 |

* cited by examiner

COMBINABLE CONFERENCE ROOMS

TECHNICAL FIELD

This disclosure relates to combinable conference room configuration. More specifically, this disclosure relates to a method for efficient reconfiguration of combinable conference rooms.

BACKGROUND

Combinable conference rooms provide for an efficient way to use multiple rooms in different configurations. Each conference room in the combinable conference room system can be used independently for conferences, presentations, and the like. Audio/video matrix switchers and processors are generally used to add microphones, video signals, and audio signals to increase the space beyond the main room to which the system can provide audio/video coverage. Audio/video matrix switchers and processors are expensive. Moreover, this approach introduces multiple points of failure into the system.

SUMMARY

Disclosed herein are systems and methods for combinable conference room configuration. In implementations, a method for configuring combinable conference rooms includes establishing a baseline audio and video (AV) signal flow for combinable conference rooms in a baseline state, generating a baseline macroinstruction from the baseline AV signal flow for the baseline state, establishing non-baseline AV signal flows for one or more non-baseline states, wherein each non-baseline AV signal flow turns off certain paths in the baseline AV signal flow to establish AV signal flow isolation between certain of the combinable conference rooms, generating a non-baseline macroinstruction for each of the one or more non-baseline states, providing an interface for selecting the baseline macroinstruction and each non-baseline macroinstruction, wherein the baseline macroinstruction and each non-baseline macroinstruction is generated for operation with an AV controller and the interface which collectively control AV signal flow of the combinable conference rooms, and configuring the combinable conference rooms in a configuration based on selection, via the interface, of one of the baseline macroinstruction or the non-baseline macroinstructions.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
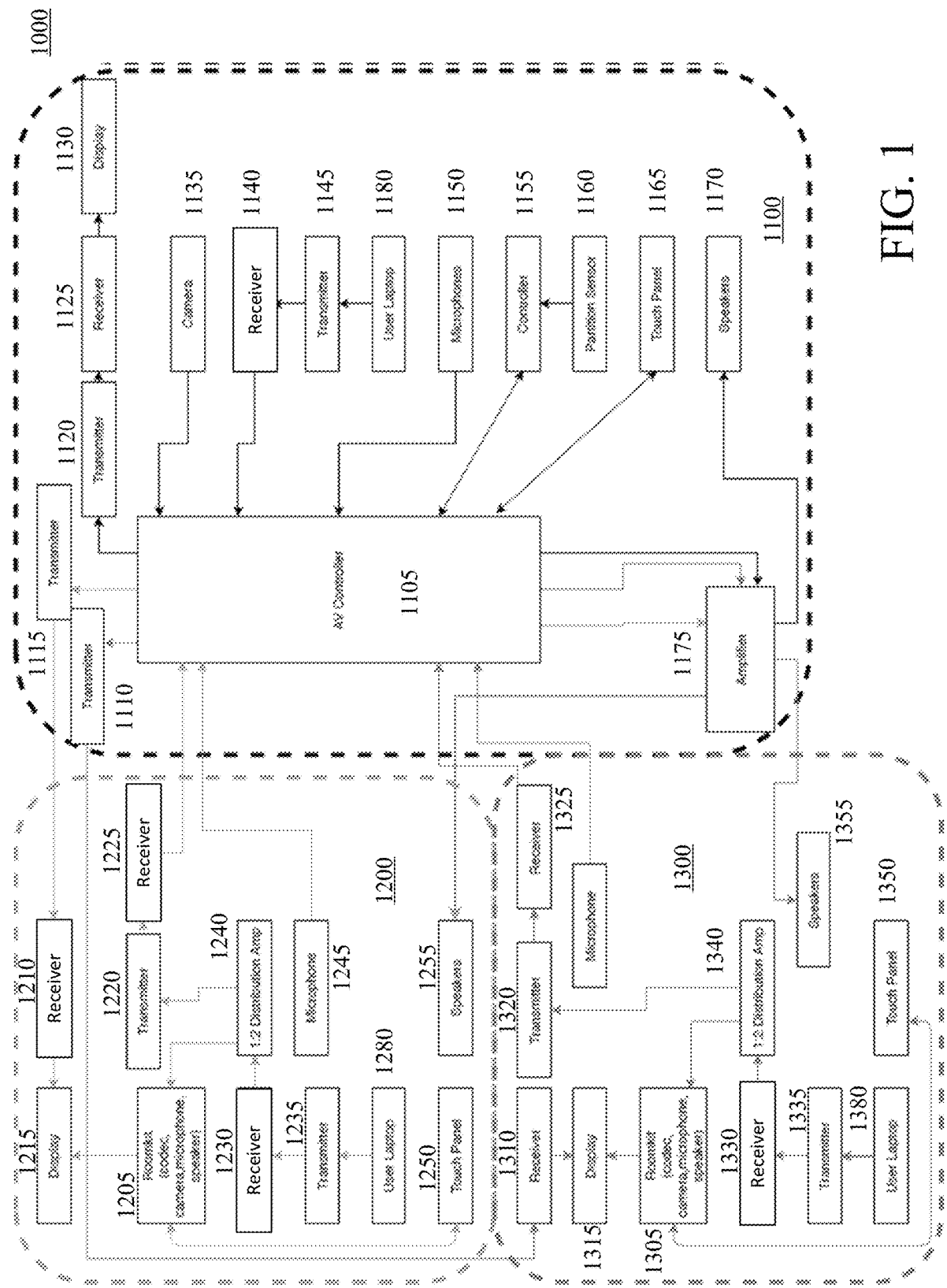
FIG. 1 is a diagram of an example combinable conference room system in a baseline configuration in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and systems for combinable conference room configuration. A combinable conference room including a main room and secondary rooms are initially configured in a baseline state, configuration, or mode (collectively "baseline configuration"). An audio/video controller, processor, or codec (collectively "AV controller") is configured to permit audio and video signal flow (herein "AV signal flow") throughout the entire space of the combinable conference room when in the baseline configuration. The AV controller isolates AV signal flow to particular rooms when the combinable conference room is in a segmented, isolated, closed, or non-baseline state, configuration, or mode (collectively "non-baseline configuration") by using one or more macros accessible on a touchscreen of the AV controller.

In an implementation, the AV controller includes macros for the baseline configuration and any non-baseline configurations. Each macro controls AV signal flow to each of the rooms in the combinable conference room by muting/unmuting or removing/restoring audio signals, video signals, speaker signals, microphone signals, and like signals based on the combinable conference room mode. This eliminates the need of expensive equipment and the multiple points of failure associated with AV switch matrices. Combinable conference room installation becomes more affordable, simplifies room design, and enhances user experience by providing a single point of AV signal management via the AV controller.

In an implementation, combinable conference room implementation is simplified by using the AV controller, AV transmitters and receivers in each room, microphones, and speakers. The AV controller may be in the main room or in a control room accessible by users of the rooms in the combinable conference room.

FIG. 1 is a diagram of an example combinable conference room system 1000 in a baseline configuration in accordance with embodiments of this disclosure. The combinable conference room system 1000 includes a main room 1100, a secondary room 1 1200, and a secondary room 2 1300. In implementations, the combinable conference room system 1000 can include a control room. In an implementation, the number of rooms is variable. In an implementation, the main room 1100 includes the control room. The combinable conference room system 1000 is illustrative and may include additional, fewer or different devices, entities, and the like which may be similarly or differently architected without departing from the scope of the specification and claims herein. Moreover, the illustrated devices may perform other functions without departing from the scope of the specification and claims herein.

The main room 1100 includes an AV controller 1105, a transmitter 1110, a transmitter 1115, a transmitter 1120, a receiver 1125, a display 1130, a camera(s) 1135, a receiver 1140, a transmitter 1145, a microphone(s) 1150, a partition controller 1155, a partition sensor 1160, a touch panel 1165, speakers 1170, and an amplifier 1175. The main room 1100 is illustrative and may include additional, fewer or different devices, entities, and the like which may be similarly or differently architected without departing from the scope of the specification and claims herein. Moreover, the illustrated devices may perform other functions without departing from the scope of the specification and claims herein.

The AV controller 1105 is configured with one or more macroinstructions which control AV signal flow configuration depending on the combinable conference room configuration. For example, the macroinstructions can set the AV signal flow for operation in all of the rooms in the combinable conference room system 1000, for operations in certain combinations of the rooms, or for operations in each room independently. The AV controller 1105 can be, for example, a Cisco roomkit Pro codec.

The transmitter 1110 is connected to or in communication with (collectively "connected to") the AV controller 1105 and the receiver 1310 and is configured to transmit AV signals from the main room 1100 to the secondary room 2 1300. The transmitter 1115 is connected to the AV controller 1105 and the receiver 1210 and is configured to transmit audio signals, video signals, or combinations thereof (collectively "AV signals") from the main room 1100 to the secondary room 1 1200. The transmitter 1120 is connected to the AV controller 1105 and the receiver 1125, which in turn is connected to the display 1130, which are collectively configured to display AV signals received from the main room 1100, the secondary room 1 1200, and the secondary room 2 1300. The cameras 1135 are connected to the AV controller and are configured to pick up images and video from the main room 1100 for transmission and display via the AV controller 1105 to the main room 1100, the secondary room 1 1200, and the secondary room 2 1300. The receiver 1140 is connected to the AV controller and the transmitter 1145 and are collectively configured to transmit AV signals from a laptop 1180 or other user device to the main room 1100, the secondary room 1 1200, and the secondary room 2 1300. The microphones 1150 are connected to the AV controller 1105 and are configured to pick-up audio from the main room 1100 for transmission via the AV controller 1105 and the amplifier 1175 to the main room 1100, the secondary room 1 1200, and the secondary room 2 1300. The partition sensor 1160 is connected to the partition controller 1155, which in turn is connected to the AV controller, and is collectively configured to sense the configuration of the combinable conference rooms and transmit the information to the AV controller 1105 to confirm configuration. The speakers 1170 are connected to the amplifier 1175 are configured to output amplified audio picked up by the microphones 1150 or by other microphones in other rooms as appropriate.

Figure 2:
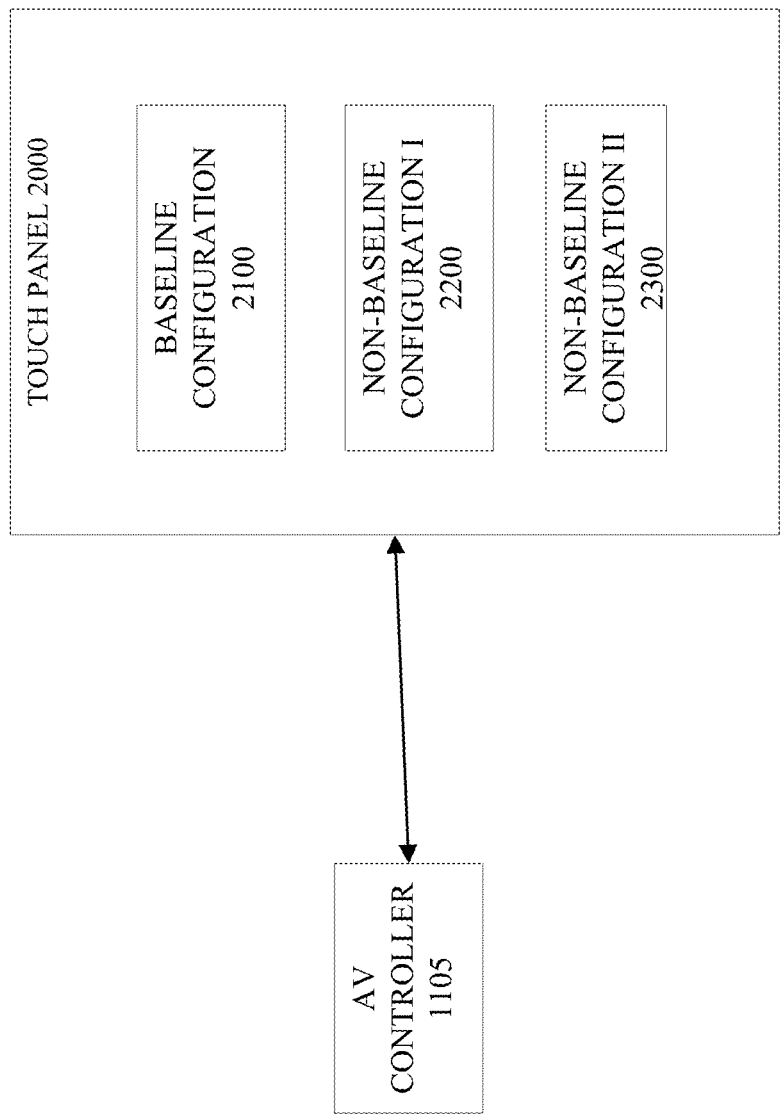
FIG. 2 is a diagram of an example touch panel in accordance with embodiments of this disclosure.

The touch panel 1165 is connected to the AV controller 1105 and is configured to permit a user to control the configuration of the combinable conference rooms as described herein by selecting a desired configuration mode, which in turn executes the macroinstruction to configure the AV signal flow. FIG. 2 is a diagram of an example touch panel 2000 in accordance with embodiments of this disclosure. The touch panel 2000 is connected to the AV controller 1105. The touch panel 2000 includes selectable combinable conference room configurations including, but not limited to, a baseline configuration 2100, a non-baseline configuration I 2200, a non-baseline configuration II 2300, and like configurations.

The amplifier 1175 is connected to the AV controller 1105 and is configured to send amplified audio signals, received via microphones in each configured room as appropriate and via the AV controller 1105, to speakers, such as the speakers 1170, 1255, and 1355, in each configured room as appropriate.

The secondary room 1 1200 includes a roomkit or collaboration platform unit 1205, a receiver 1210, a display 1215, a transmitter 1220, a receiver 1225, a receiver 1230, a transmitter 1235, a distribution amplifier 1240, a microphone 1245, a touch panel 1250, and speakers 1255. The secondary room 1 1200 is illustrative and may include additional, fewer or different devices, entities, and the like which may be similarly or differently architected without departing from the scope of the specification and claims herein. Moreover, the illustrated devices may perform other functions without departing from the scope of the specification and claims herein.

The receiver 1210 is connected to the display 1215 and are collectively configured to display AV signals received from the transmitter 1115. The roomkit or collaboration platform 1205 is connected to the display 1215 and collectively configured to display AV signals received via the distribution amplifier 1240 from the receiver 1230 and the transmitter 1235, which in turn can be connected to a laptop 1280 or like user device. The roomkit or collaboration platform 1205 includes an integrated codec, camera, microphone, speaker, and other items and can be controlled via the touch panel 1250. The distribution amplifier 1240 is further connected to the transmitter 1220 which is connected to the receiver 1225, which in turn in connected to the AV controller 1105 and collectively configured to transmit AV signals to the AV controller 1105 from the secondary room 1 1200. The microphone(s) 1245 is connected to the AV controller 1105 and configured to pick-up audio from the secondary room 1 1200 for transmission via the AV controller 1105 and the amplifier 1175 to the main room 1100, the secondary room 1 1200, and the secondary room 2 1300 as appropriate. The speaker(s) 1255 are connected to the amplifier 1175 and configured to output amplified audio picked up by microphones in the main room 1100, the secondary room 1 1200, and the secondary room 2 1300 as appropriate.

The secondary room 2 1300 includes a roomkit or collaboration platform unit 1305, a receiver 1310, a display 1315, a transmitter 1320, a receiver 1325, a receiver 1330, a transmitter 1335, a distribution amplifier 1340, a microphone 1345, a touch panel 1350, and speakers 1355. The secondary room 2 1300 is illustrative and may include additional, fewer or different devices, entities, and the like which may be similarly or differently architected without departing from the scope of the specification and claims herein. Moreover, the illustrated devices may perform other functions without departing from the scope of the specification and claims herein.

The receiver 1310 is connected to the display 1315 and are collectively configured to display AV signals received from the transmitter 1110. The roomkit or collaboration platform 1305 is connected to the display 1315 and collectively configured to display AV signals received via the distribution amplifier 1340 from the receiver 1330 and the transmitter 1335, which in turn can be connected to a laptop 1380 or like user device. The roomkit or collaboration platform 1305 includes an integrated codec, camera, microphone, speaker, and other items and can be controlled via the touch panel 1350. The distribution amplifier 1340 is further connected to the transmitter 1320 which is connected to the receiver 1325, which in turn in connected to the AV controller 1105 and collectively configured to transmit AV signals to the AV controller 1105 from the secondary room 2 1300. The microphone(s) 1345 is connected to the AV controller 1105 and configured to pick-up audio from the secondary room 2 1300 for transmission via the AV controller 1105 and the amplifier 1175 to the main room 1100, the secondary room 1 1200, and the secondary room 2 1300 as appropriate. The speaker(s) 1355 are connected to the amplifier 1175 and configured to output amplified audio picked up by microphones in the main room 1100, the secondary room 1 1200, and the secondary room 2 1300 as appropriate.

Operationally, each room in a combinable conference room system is outfitted for collaborative and independent operation. A baseline configuration is determined where all rooms in the combinable conference room system are fully connected and AV signals are transmitted between each of the main room 1100, the secondary room 1 1200, and the secondary room 2 1300. A baseline configuration macroinstruction is generated for the baseline configuration and presented on a touch panel, such as touch panel 1165 or 2000, for selection by a user, such as for example, baseline configuration 2100. In an illustrative example, FIG. 1 shows a baseline configuration where the main room 1100, the secondary room 1 1200, and the secondary room 2 1300 are combined and fully connected.

Macroinstructions are generated for each non-baseline configuration by turning off, disabling, or muting certain AV signals between the rooms. Each non-baseline configuration macroinstruction is then presented on the touch panel for selection by a user.

Figure 3:
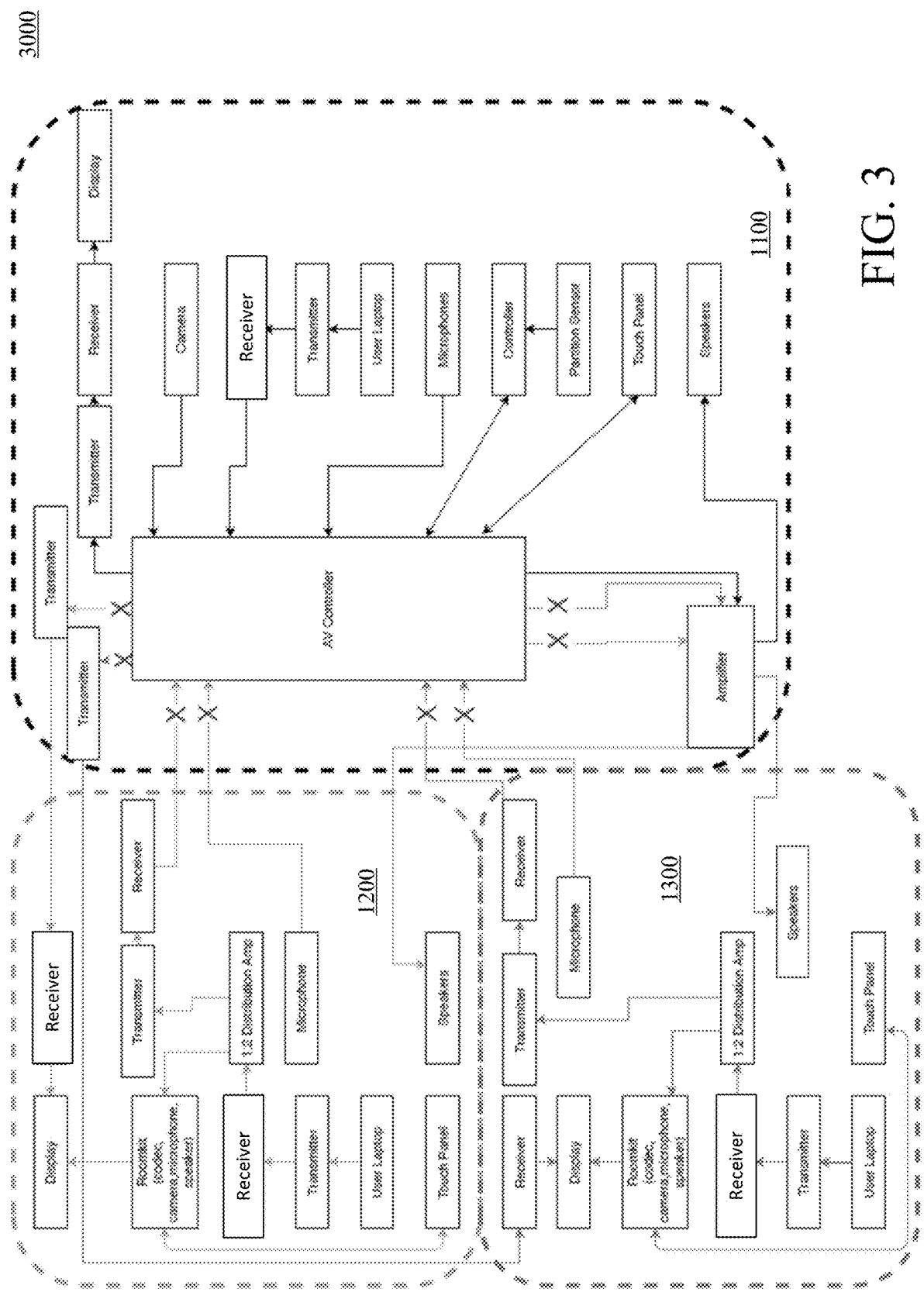
FIG. 3 is a diagram of an example combinable conference room system in a non-baseline configuration in accordance with embodiments of this disclosure.

In an illustrative example, FIG. 3 is a diagram of an example combinable conference room system in a non-baseline configuration 3000 in accordance with embodiments of this disclosure. In the non-baseline configuration 3000, each of the main room 1100, the secondary room 1 1200, and the secondary room 2 1300 are separate conference rooms. Selection of the non-baseline configuration 3000 on the touch panel 1165, for example, disables signal transmission between the main room 1100, the secondary room 1 1200, and the secondary room 2 1300 and are marked by an "X".

Figure 4:
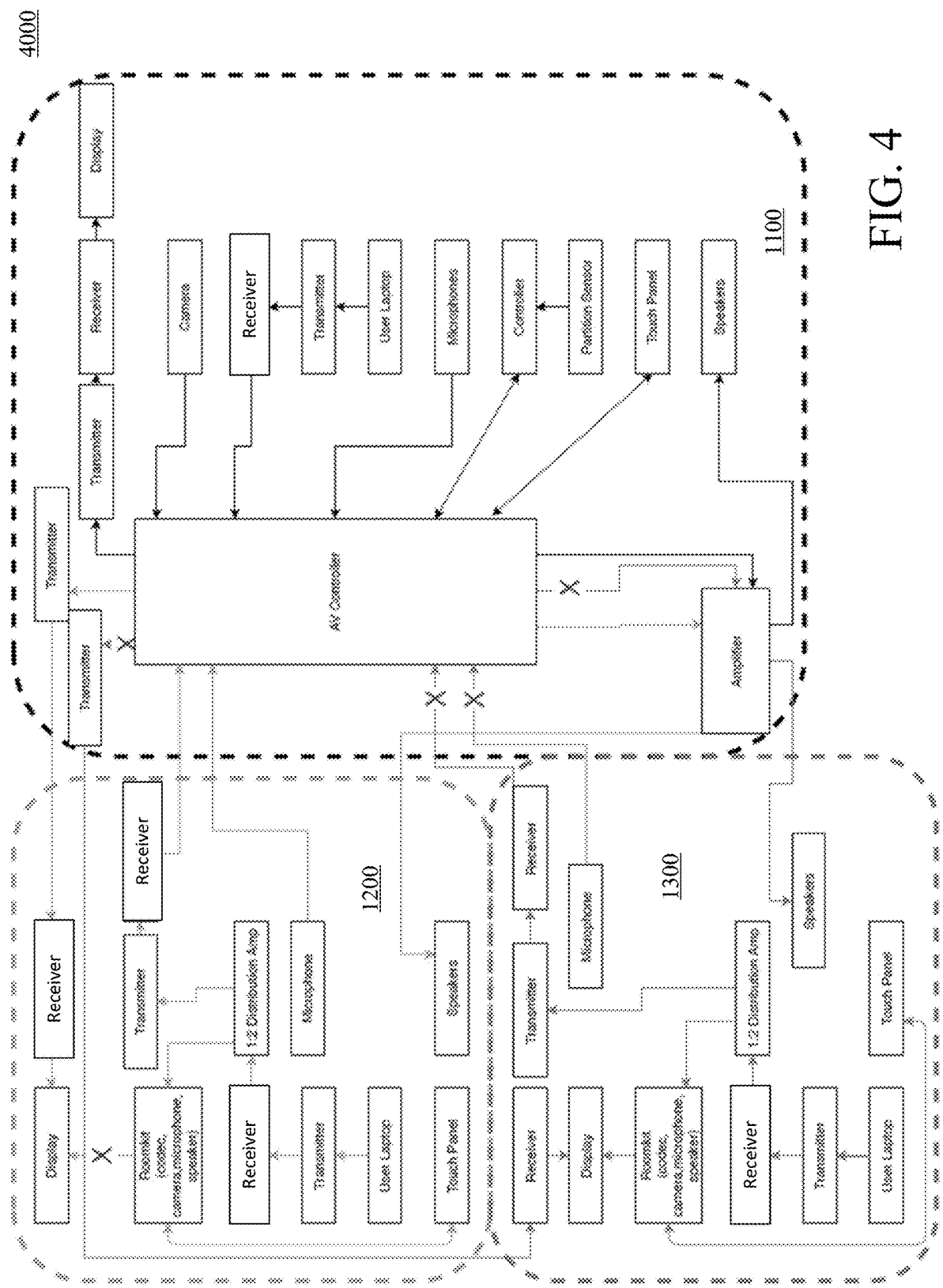
FIG. 4 is a diagram of an example combinable conference room system in a non-baseline configuration in accordance with embodiments of this disclosure.

In an illustrative example, FIG. 4 is a diagram of an example combinable conference room system in a non-baseline configuration 4000 in accordance with embodiments of this disclosure. In the non-baseline configuration 4000, the main room 1100 and the secondary room 1 1200 are combined and the secondary room 2 1300 is separate from the combined main room 1100 and secondary room 1 1200. Selection of the non-baseline configuration 4000 on the touch panel 1165, for example, maintains signal transmission between the main room 1100 and the secondary room 1 1200, and disables the signal transmission to and from the secondary room 2 1300 and are marked by an "X".

Figure 5:
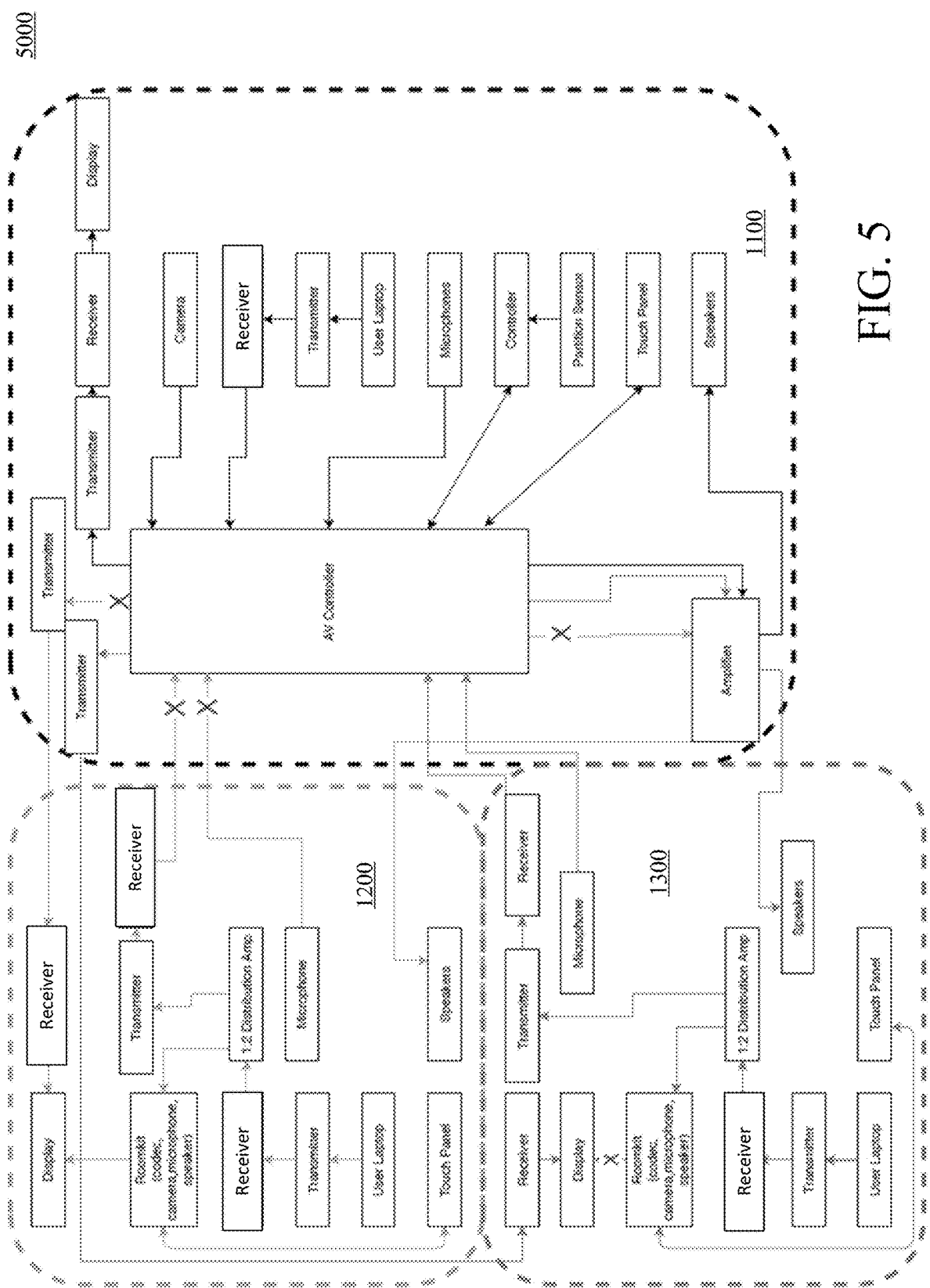
FIG. 5 is a diagram of an example combinable conference room system in a non-baseline configuration in accordance with embodiments of this disclosure.

In an illustrative example, FIG. 5 is a diagram of an example combinable conference room system in a non-baseline configuration 5000 in accordance with embodiments of this disclosure. In the non-baseline configuration 5000, the main room 1100 and the secondary room 2 1300 are combined and the secondary room 1 1200 is separate from the combined main room 1100 and secondary room 2 1300. Selection of the non-baseline configuration 5000 on the touch panel 1165, for example, maintains signal transmission between the main room 1100 and the secondary room 2 1300, and disables the signal transmission to and from the secondary room 1 1200 and are marked by an "X".

Figure 6:
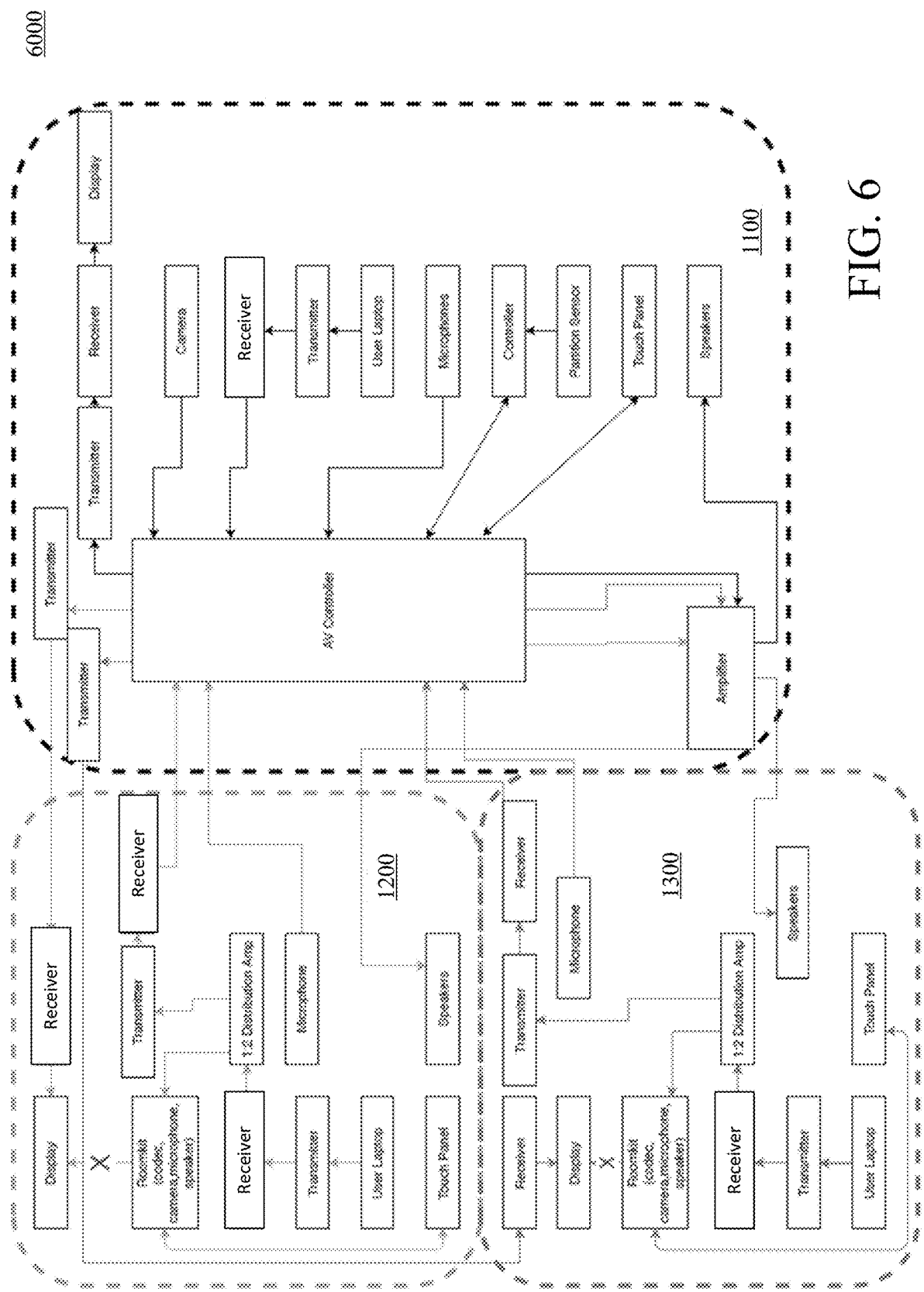
FIG. 6 is a diagram of an example combinable conference room system in a non-baseline configuration in accordance with embodiments of this disclosure.

In an illustrative example, FIG. 6 is a diagram of an example combinable conference room system in a non-baseline configuration 6000 in accordance with embodiments of this disclosure. In the non-baseline configuration 6000, the main room 1100, the secondary room 1 1200, and the secondary room 2 1300 are combined but AV signals are only displayed from the main room 1100. Audio signals between the main room 1100, the secondary room 1 1200, and the secondary room 2 1300 are maintained. Selection of the non-baseline configuration 6000 on the touch panel 1165, for example, maintains audio signal transmission between the main room 1100, the secondary room 1 1200, and the secondary room 2 1300, and disables the AV signal transmission for display purposes in each of the secondary room 1 1200 and the secondary room 2 1300 and are marked by an "X".

Figure 7:
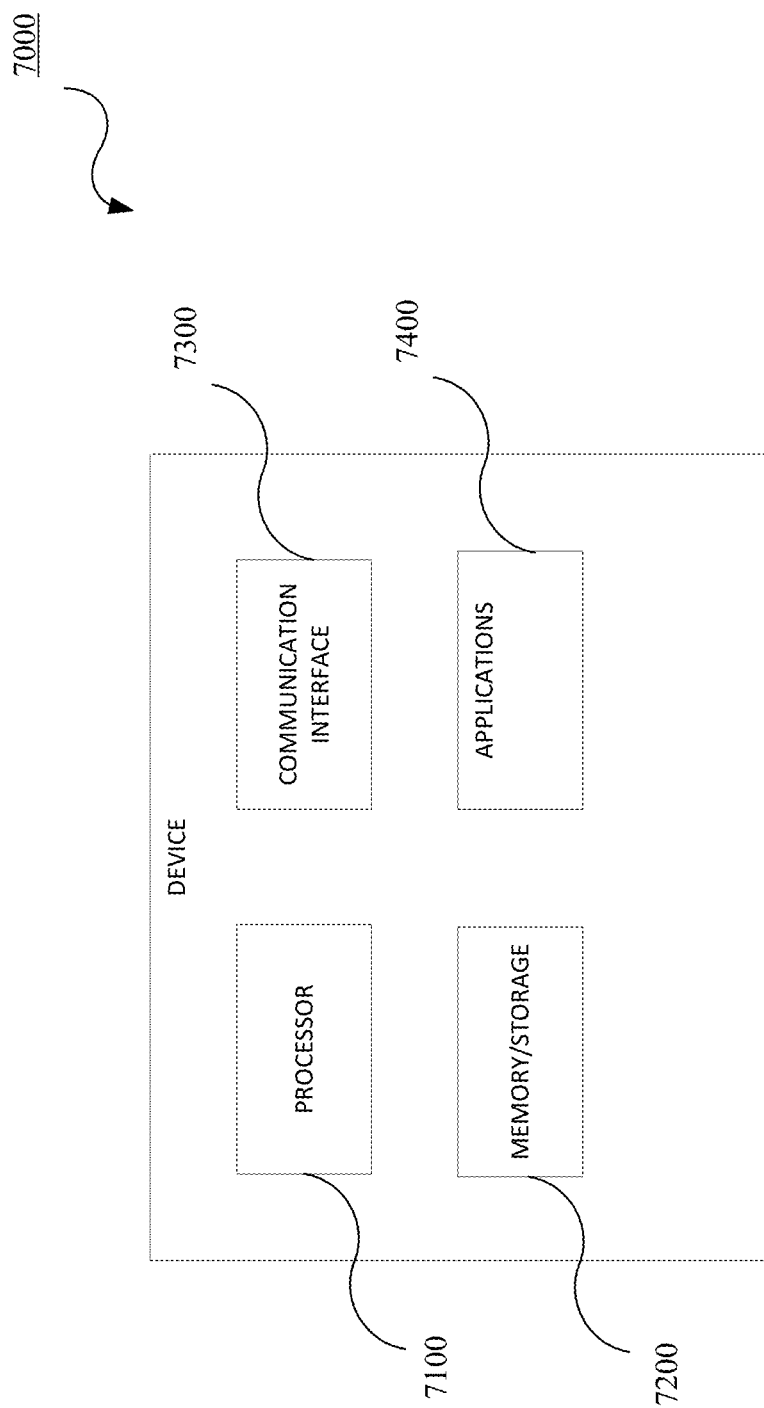
FIG. 7 is a block diagram of an example of a device in accordance with embodiments of this disclosure.

FIG. 7 is a block diagram of an example of a device 7000 in accordance with embodiments of this disclosure. The device 7000 may include, but is not limited to, a processor 7100, a memory/storage 7200, a communication interface 7300, and applications or macroinstructions 7400. The device 7000 may include or implement, for example, the AV controller 1105. In an implementation, the memory/storage 7200 may store the macroinstructions as applicable. The combinable conference room techniques or methods described herein may be stored in the memory/storage 7200 and executed by the processor 7100 in cooperation with the memory/storage 7200, the communications interface 7300, and applications and/or macroinstructions 7400, as appropriate. The device 7000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 8:
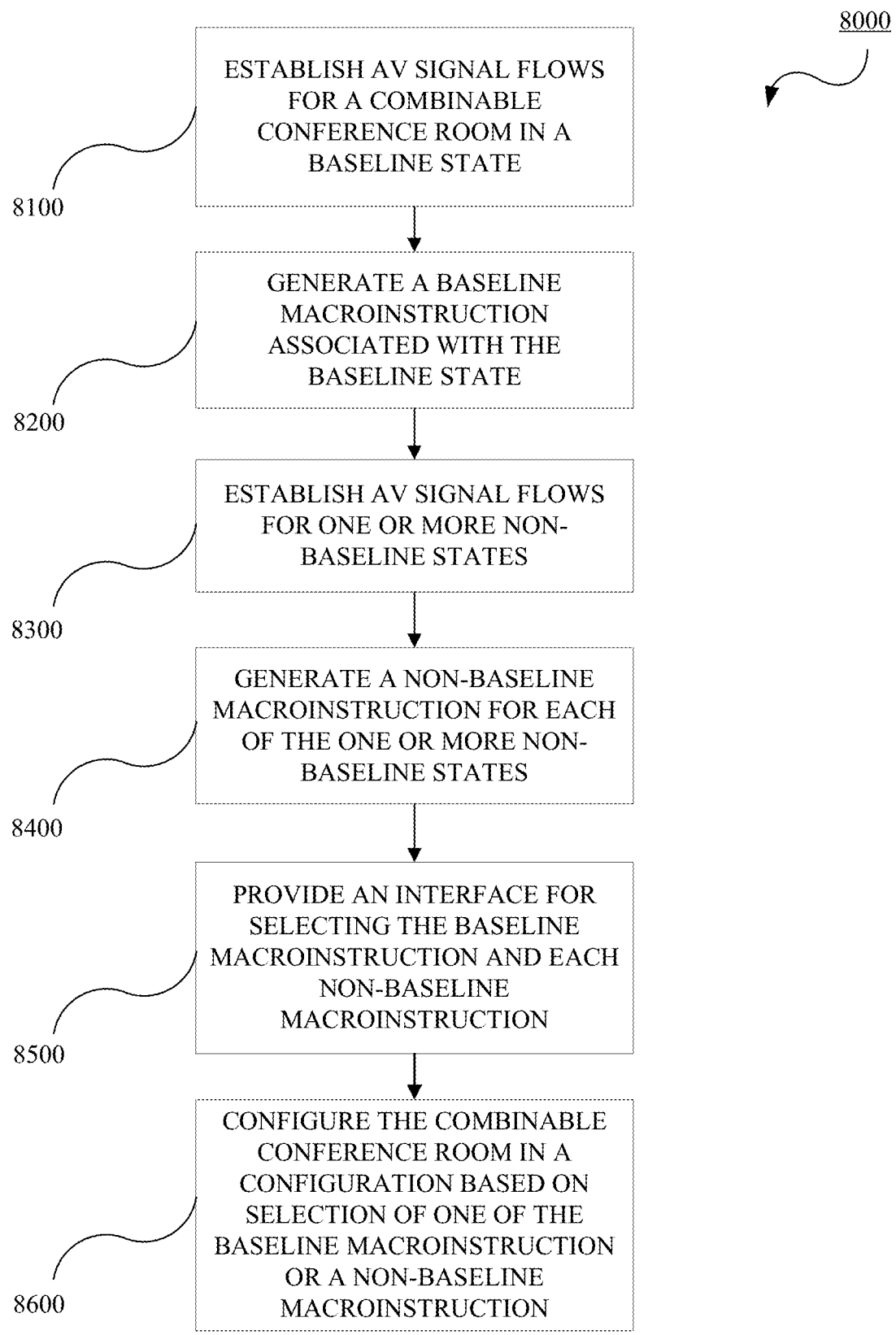
FIG. 8 is a flowchart of an example method for combinable room configuration in accordance with embodiments of this disclosure.

FIG. 8 is a flowchart of an example method 8000 for combinable conference room configuration in accordance with embodiments of this disclosure. The method 8000 includes: establishing 8100 AV signal flows for a combinable conference room in a baseline state; generating 8200 a baseline macroinstruction associated with the baseline state; establishing 8300 AV signal flows for one or more non-baseline states; generating 8400 a non-baseline macroinstruction for each of the one or more non-baseline states; providing 8500 an interface for selecting the baseline macroinstruction and each non-baseline macroinstruction; configuring 8600 the combinable conference room in a configuration based on selection of one of the baseline macroinstruction or a non-baseline macroinstruction. For example, the method 8000 may be implemented, as applicable and appropriate, by the AV controller 1105, the device 500, and the processor 7100.

The method 8000 includes establishing 8100 AV signal flows for a combinable conference room in a baseline state. All the rooms in the combinable conference room are combined together and an AV signal flow is established between each of the rooms. The AV signal flow includes audio and video signals originating from user devices, and audio and video signals captured by cameras and microphones and outputted on displays and speakers as appropriate. Each of the rooms can be physically separable but connected via the AV signal flow when in the baseline state.

The method 8000 includes generating 8200 a baseline macroinstruction associated with the baseline state. A baseline macroinstruction is generated for an AV controller based on the AV signal flow established for the baseline state. For example, this can be done using an application programming interface for the AV controller.

The method 8000 includes establishing 8300 AV signal flows for one or more non-baseline states. The combinable conference room is configured into each non-baseline state by turning off the appropriate AV signal flow such that one or more rooms of the combinable conference room is AV signal flow isolated from the other rooms in the non-baseline states.

The method 8000 includes generating 8400 a non-baseline macroinstruction for each of the one or more non-baseline states. A macroinstruction is generated for each non-baseline state based on resulting AV signal flows. For example, this can be done using an application programming interface for the AV controller.

The method 8000 includes providing 8500 an interface for selecting the baseline macroinstruction and each non-baseline macroinstruction. The baseline macroinstruction and the non-baseline macroinstructions are presented on a user interface, such as a touch panel. The baseline macroinstruction ensures that all combined rooms can communicate with each other when selected by a user. The non-baseline macroinstructions ensure that one or more rooms are AV signal flow isolated from each other when selected by a user.

The method 8000 includes configuring 8600 the combinable conference room in a configuration based on selection of one of the baseline macroinstruction or a non-baseline macroinstruction. A selection of a macroinstruction on the user interface by a user configures the AV signal flow as appropriate.

In general, a method for configuring combinable conference rooms, the method includes establishing a baseline audio and video (AV) signal flow for combinable conference rooms in a baseline state, generating a baseline macroinstruction from the baseline AV signal flow for the baseline state, establishing non-baseline AV signal flows for one or more non-baseline states, wherein each non-baseline AV signal flow turns off certain paths in the baseline AV signal flow to establish AV signal flow isolation between certain of the combinable conference rooms, generating a non-baseline macroinstruction for each of the one or more non-baseline states, providing an interface for selecting the baseline macroinstruction and each non-baseline macroinstruction, wherein the baseline macroinstruction and each non-baseline macroinstruction is generated for operation with an AV controller and the interface which collectively control AV signal flow of the combinable conference rooms, and configuring the combinable conference rooms in a configuration based on selection, via the interface, of one of the baseline macroinstruction or the non-baseline macroinstructions. In implementations, the AV signal flow includes audio and video signals originating from user devices, audio and video signals captured by cameras and microphones, and audio and video signals output on displays and speakers. In implementations, the combinable conference rooms are physically separable. In implementations, when the combinable conference rooms are in the baseline state there is full AV signal flow between each of the combinable conference rooms. In implementations, when the combinable conference rooms are in the non-baseline states, certain of the AV signal flows are isolated. In implementations, each of the non-baseline configurations include at least one of the combinable conference rooms.

In general, a combinable conference room system includes a user interface device, a plurality of combinable conference rooms including a primary combinable conference room and at least one secondary combinable conference room, an audio and video (AV) control room including an AV controller configured to control AV pathways for different combinations of the plurality of combinable conference rooms, and a plurality of macroinstructions for execution on the AV controller, each macroinstruction configuring disconnection of certain AV pathways associated with the plurality of combinable conference rooms in a base mode, wherein the AV controller configured to execute one of the plurality of macroinstructions upon selection via the user interface of a partial combined mode associated with each of the different combinations of the plurality of combinable conference rooms. In implementations, each AV pathway includes certain audio and video signals originating from user devices, audio and video signals captured by cameras and microphones, and audio and video signals output on displays and speakers. In implementations, the plurality of combinable conference rooms are physically separable. In implementations, when the plurality of combinable conference rooms is in the base mode, the plurality of combinable conference rooms are interconnected via the AV pathways. In implementations, when the plurality of combinable conference rooms is in the partial combined mode, certain of the plurality of combinable conference rooms are AV pathway isolated. In implementations, the primary room and the AV control room are one room. In implementations, the user interface is in the primary room. In implementations, the user interface is in the AV control room.

In general, a method for configuring combinable conference rooms, the method includes generating a primary macroinstruction from a base audio and video (AV) signal flow when all rooms are in a fully combined configuration, generating secondary macroinstructions from each AV signal flow associated with each non-full combination of the rooms, wherein the primary macroinstruction and the secondary macroinstructions are executed by an AV processor, selecting, via a user interface, one of the primary macroinstruction or the secondary macroinstructions, and configuring the rooms in a selected configuration by eliminating certain connections in a base AV signal flow to create AV signal flow isolation for each non-full combination. In implementations, the AV signal flow includes audio and video signals originating from user devices, audio and video signals captured by cameras and microphones, and audio and video signals output on displays and speakers. In implementations, the rooms are physically separable. In implementations, the rooms are interconnected via the AV signal flow in a fully combined configuration. In implementations, the rooms are isolated using the AV signal flow when in the non-full configuration. In implementations, the method further including configuring each room with audio and video devices to establish the base AV signal flow.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for configuring combinable conference rooms, the method comprising:
   establishing a baseline audio and video (AV) signal flow for physical combinable conference rooms in a baseline state;
   generating a baseline macroinstruction from the baseline AV signal flow for the baseline state;
   establishing non-baseline AV signal flows for one or more non-baseline states, wherein each non-baseline AV signal flow turns off certain paths in the baseline AV signal flow to establish AV signal flow isolation between certain of the physical combinable conference rooms;
   generating a non-baseline macroinstruction for each of the one or more non-baseline states;
   providing an interface for selecting the baseline macroinstruction and each non-baseline macroinstruction, wherein the baseline macroinstruction and each non-baseline macroinstruction is generated for operation with an AV controller and the interface which collectively control AV signal flow of the physical combinable conference rooms; and
   configuring the combinable conference rooms in a configuration based on selection, via the interface, of one of the baseline macroinstruction or the non-baseline macroinstructions.

2. The method of claim 1, wherein the AV signal flow includes audio and video signals originating from user devices, audio and video signals captured by cameras and microphones, and audio and video signals output on displays and speakers.

3. The method of claim 2, wherein the physical combinable conference rooms are physically separable.

4. The method of claim 3, wherein when the physical combinable conference rooms are in the baseline state there is full AV signal flow between each of the physical combinable conference rooms.

5. The method of claim 4, wherein when the physical combinable conference rooms are in the non-baseline states, certain of the AV signal flows are isolated.

6. The method of claim 5, wherein each of the non-baseline configurations include at least one of the physical combinable conference rooms.

7. A combinable conference room system comprising:
a user interface device;
a plurality of physical combinable conference rooms including a primary combinable conference room and at least one secondary combinable conference room;
an audio and video (AV) control room including an AV controller configured to control AV pathways for different combinations of the plurality of physical combinable conference rooms; and
a plurality of macroinstructions for execution on the AV controller, each macroinstruction configuring disconnection of certain AV pathways associated with the plurality of physical combinable conference rooms in a base mode,
wherein the AV controller configured to execute one of the plurality of macroinstructions upon selection via the user interface of a partial combined mode associated with each of the different combinations of the plurality of physical combinable conference rooms.

8. The system of claim 7, wherein each AV pathway includes certain audio and video signals originating from user devices, audio and video signals captured by cameras and microphones, and audio and video signals output on displays and speakers.

9. The system of claim 8, wherein the plurality of physical combinable conference rooms are physically separable.

10. The system of claim 9, wherein when the plurality of physical combinable conference rooms is in the base mode, the plurality of physical combinable conference rooms are interconnected via the AV pathways.

11. The system of claim 10, wherein when the plurality of physical combinable conference rooms is in the partial combined mode, certain of the plurality of physical combinable conference rooms are AV pathway isolated.

12. The system of claim 11, wherein the primary combinable conference room and the AV control room are one room.

13. The system of claim 12, wherein the user interface is in the primary combinable conference room.

14. The system of claim 11, wherein the user interface is in the AV control room.

15. A method for configuring physical combinable conference rooms, the method comprising:
generating a primary macroinstruction from a base audio and video (AV) signal flow when all physical rooms are in a fully combined configuration;
generating secondary macroinstructions from each AV signal flow associated with each non-full combination of the physical rooms, wherein the primary macroinstruction and the secondary macroinstructions are executed by an AV processor;
selecting, via a user interface, one of the primary macroinstruction or the secondary macroinstructions; and
configuring the rooms in a selected configuration by eliminating certain connections in a base AV signal flow to create AV signal flow isolation for each non-full combination.

16. The method of claim 15, wherein the AV signal flow includes audio and video signals originating from user devices, audio and video signals captured by cameras and microphones, and audio and video signals output on displays and speakers.

17. The method of claim 16, wherein the physical rooms are physically separable.

18. The method of claim 17, wherein the physical rooms are interconnected via the AV signal flow in a fully combined configuration.

19. The method of claim 18, wherein the physical rooms are isolated using the AV signal flow when in the non-full configuration.

20. The method of claim 19, further comprising:
configuring each physical room with audio and video devices to establish the base AV signal flow.

* * * * *